United States Patent Office 2,969,384
Patented Jan. 24, 1961

2,969,384

PRODUCTION OF ALKYL (ALKOXY OR ARYL-OXY) ALUMINUM HALIDES

Guenther Hamprecht, Limburgerhof, Pfalz, and Heinrich Oertel and Matthias Schwarzmann, Ludwigshafen (Rhine), Germany, assignors to Badische Anilin- & Soda-Fabrik Aktiengesellschaft, Ludwigshafen (Rhine), Germany No Drawing. Filed Aug. 26, 1959, Ser. No. 836,069

Claims priority, application Germany Sept. 18, 1958

6 Claims. (Cl. 260—448)

This invention relates to a process for the production of organo-aluminum compounds.

Organo-aluminum compounds of the general formula:

Al.R(OR')X in which R represents an alkyl radical and OR' an alkoxy or aryloxy radical and X a halogen atom, can be prepared by reacting a reducing metal, for example aluminum, with an aluminum halide and an ether at elevated temperature.

We have now found that organo-aluminum compounds of the general formula Al.R(OR')X, in which R represents a lower alkyl radical with 1 to 3 carbon atoms, OR' an alkoxy or aryloxy radical with up to 20 carbon atoms and X chlorine, bromine or iodine, can be prepared in a simple way and in practically quantitative yields by reaction of an alkyl aluminum sesquihalide with the equivalent amount of an aluminum alcoholate or phenolate.

Aluminum sesquihalides are compounds of the formula AlR$_2$X.AlRX$_2$, wherein R represents a lower alkyl radical containing from 1 to 3 carbon atoms and X represents chlorine, bromine or iodine. Suitable aluminum sesquihalides are for example, methyl, ethyl or propyl aluminum sesquichloride and the analogous bromides or iodides. As aluminum alcoholates and phenolates there may be used for example the corresponding compounds of aliphatic or aromatic monohydric saturated alcohols with up to 20 carbon atoms, for example of lower alkanols, such as methanol, ethanol, propanol or butanol, or of hexanol, octanol, dodecyl alcohol or cetyl alcohol or the corresponding compounds of phenol, cresol or naphthol. It is not necessary that the compounds used as initial materials should be present in pure form.

The alkyl alkoxy or aryloxy aluminum halides can be prepared according to this invention by simply reacting the initial components. It is preferable to place the solid aluminum alcoholate or phenolate in a reaction vessel and to add thereto the equivalent amount (mol ratio 1:1) of the alkyl aluminum sesquihalide. Having regard to the heat thereby evolved, it is preferable to add the alkyl aluminum sesquihalide in portions. In some cases it is advantageous to carry out the reaction in the presence of an organic solvent which is inert under the reaction conditions, as for example halogenated hydrocarbons, such as carbon tetrachloride, or aromatic hydrocarbons, such as benzene, toluene, xylene and the like. The reaction of the initial materials should be carried out under absolutely anhydrous conditions and while excluding atmospheric oxygen. When working in the presence of inert organic solvents, these should also be anhydrous. The yields of alkyl alkoxy or aryloxy aluminum halides obtainable by the process according to this invention are practically quantitative. The reaction temperature lies between 30° and 150° C., preferably between 70° and 120° C. If the reaction is carried out in the presence of an organic solvent, the reaction temperature is usually governed by the boiling temperature of the solvent. The organo-aluminum compounds obtained can be distilled off in vacuo from the reactors in which they have been prepared and they are then obtained free from impurities and byproducts. They can be used as reducing agents in organic reactions or as polymerization catalysts.

The following examples will further illustrate this invention but the invention is not restricted to these examples. The parts specified in the examples are parts by weight.

Example 1

162 parts of aluminum ethylate are introduced into a vessel and 247 parts of ethyl aluminum sesquichloride are gradually added thereto. While excluding air and moisture, the mixture is stirred until all the aluminum ethylate has dissolved. The mixture is then distilled in vacuo. 390 parts of ethyl ethoxy aluminum chloride, boiling between 85° and 90° C. at 3 mm. Hg, are obtained. This is a yield of 95%.

Example 2

As described in Example 1, 247 parts of ethyl aluminum sesquichloride are reacted with 162 parts of aluminum ethylate dissolved in 400 parts of toluene. After evaporating off the solvent, 350 parts of ethyl ethoxy aluminum chloride are obtained by vacuum distillation.

Example 3

247 parts of ethyl aluminum sesquichloride are reacted with 204 parts of aluminum propylate as described in Example 1. By vacuum distillation, 430 parts of ethyl isopropoxy aluminum chloride are obtained, corresponding to a yield of 95%.

Example 4

As described in Example 1, 247 parts of ethyl aluminum sesquichloride are reacted with 246 parts of aluminum normal butylate and the mixture distilled at 124° to 126° C. at 3 mm. Hg. 470 parts of ethyl normal-butoxy aluminum chloride are obtained, corresponding to a yield of 95%.

Example 5

As described in Example 1, 205 parts of methyl aluminum sesquichloride are reacted with 306 parts of aluminum phenolate. By distillation at 125° C. and 1 mm. Hg, 460 parts of methyl phenoxy aluminum chloride are obtained, corresponding to a yield of 90%.

Example 6

381 parts of ethyl aluminum sesquibromide are reacted with 162 parts of aluminum ethylate as described in Example 1. By vacuum distillation, there are obtained at 96° to 100° C. and 2 mm. Hg, about 500 parts of ethyl ethoxy aluminum bromide, corresponding to a yield of more than 90%.

Example 7

As described in Example 1, 247 parts of ethyl aluminum sesquichloride are reacted with 204 parts of aluminum normal propylate which is suspended and partly dissolved in 200 parts of cyclohexane.

After evaporating off the solvent there are obtained by vacuum distillation at 89° to 93° C. and 5 mm. Hg, 405 parts of ethyl normal-propoxy aluminum chloride, corresponding to a yield of 90%.

What we claim is:

1. A process for the production of organo-aluminum compounds of the general formula Al.R(OR')X, in which R represents a lower alkyl radical containing from 1 to 3 carbon atoms inclusive and OR' is a radical selected from the group consisting of alkoxy radicals containing up to 20 carbon atoms and aryloxy radicals containing 6 to 10 carbon atoms, and X represents a halogen selected from the group consisting of chlorine, bromine and iodine, which comprises reacting an alkyl aluminum sesquihalide of the formula $AlR_2X \cdot AlRX_2$ with about equivalent amounts of an organo-aluminum compound of the general formula $Al(OR')_3$ in which OR' has the meaning set forth above.

2. A process as claimed in claim 1 wherein the reaction is carried out in the presence of an organic solvent which is inert under the reaction conditions.

3. A process for the production of ethyl ethoxy aluminum chloride, which comprises reacting ethyl aluminum sesquichloride with an equivalent amount of aluminum ethylate.

4. A process for the production of ethyl isopropoxy aluminum chloride which comprises reacting ethyl aluminum sesquichloride with an about equivalent amount of aluminum propylate.

5. A process for the production of ethyl ethoxy aluminum bromide, which comprises reacting ethyl aluminum sesquibromide with an about equivalent amount of aluminum ethylate.

6. A process for the production of ethyl normal-propoxy aluminum chloride, which comprises reacting ethyl aluminum sesquichloride with an about equivalent amount of aluminum normal propylate.

References Cited in the file of this patent

UNITED STATES PATENTS 2,867,643   Hamprecht et al. ——————— Jan. 6, 1959